United States Patent [19]

Valverde

[11] 3,999,487
[45] Dec. 28, 1976

[54] PNEUMATIC TRANSPORTATION SYSTEM

[76] Inventor: Rene L. Valverde, 517 Zamora Ave., Coral Gables, Fla. 33134

[22] Filed: Apr. 14, 1975

[21] Appl. No.: 567,543

[52] U.S. Cl. .......................... 104/138 R; 104/155; 243/2
[51] Int. Cl.[2] ...................................... B61B 13/10
[58] Field of Search ....... 104/138 R, 138 G, 147 R, 104/155; 105/365; 243/2, 6, 32, 39; 302/23, 24, 25

[56] References Cited

UNITED STATES PATENTS

| | | | |
|---|---|---|---|
| 3,148,845 | 9/1964 | Buchwald et al. | 243/6 X |
| 3,265,324 | 8/1966 | Mach et al. | 243/6 |
| 3,384,031 | 5/1968 | Dashew et al. | 104/138 R |
| 3,404,638 | 10/1968 | Edwards | 104/138 R X |
| 3,656,436 | 4/1972 | Edwards | 104/138 R |
| 3,853,355 | 12/1974 | Buisson | 243/6 X |

Primary Examiner—Robert J. Spar
Assistant Examiner—Randolph A. Reese
Attorney, Agent, or Firm—Malin & Haley

[57] ABSTRACT

An pneumatically actuated transportation system for use in moving cargo or passengers on a load carrying vehicle or coupled train of vehicles which are disposed along a fluid sealed duct. Load carrying vehicles are motivated within sealed duct sections by a differential air pressure between the front and rear of the vehicular train, the differential air pressure being achieved by propelling or forcing air into the duct section increasing air pressure behind the vehicle while simultaneously evacuating air from the duct section in front of the vehicle. A plurality of air pumping stations are disposed at intervals along the main transport duct, with each station extracting air from a portion of the duct on one side of the pumping device while forcing the air into the portion of the duct on the opposite side of the pumping device. At each station, a system of air pumps and duct valves permit the build-up and reduction of air pressures within adjacent duct sections necessary for propelling the vehicle at a designed speed, with the valve openings being related to the position of the vehicle along the duct itself.

2 Claims, 8 Drawing Figures

PNEUMATIC TRANSPORTATION SYSTEM

BACKGROUND OF THE INVENTION

This invention relates generally to a pneumatically actuated load carrying transportation system which can be used in transporting cargo or passengers on a single or plurality of vehicles which are driven along a pneumatically sealed duct between different geographical locations. Specifically, the invention relates to an improved conduit and air pumping supply network with necessary valves used in conjunction with the movement of vehicles by differential air pressure through a duct work system itself.

The use of a pneumatic or fluid pressure differential for driving vehicles within a closed duct system is known in the prior art. Systems shown in the prior art suffered from extreme complexity for satisfactory operation of the utilization of extremely high and low pneumatic pressure differentials which increased duct stress limitations and increased energy requirements making the overall feasibility and practicability of such systems doubtful due to extremely high cost and the like. Additional problems with pressure extremes included increased system leakage and loss of pressure and increased problems regarding the seals around the vehicles between the duct and the vehicle. The instant invention provides an improved pneumatically actuated vehicular transportation system which reduces the complexity of the system while providing for improved operational results. The system includes the utilization of a plurality of pumping devices which can move a mass of air and which are deployed in an array of pumping stations, with each station extracting air from one sealed section of the transport duct while taking the same mass of air and forcing it into another sealed section of the duct, with each station having a valving system which is controlled by a switching system, preferably electronic, actuated by the relative position of the vehicle along the transport duct. The transport duct is sealed from adjacent sections by a valve at each pumping station. Sectional sealing of the main transport duct allows air pressure behind the moving vehicle to be increased, with the valve mechanism being operated and switched to an open position when the vehicle has approached a pumping station such that the vehicle may pass through the pumping station with the valve in the open position. Once vehicle passage of the pumping station is accomplished, the main transport duct valve will immediately close allowing the increase of air pressure behind the vehicle. Once the operational velocity of the vehicle is achieved, the system is designed to maintain the vehicle at a constant speed by maintaining a constant pressure differential between the front and rear of the vehicle. The vehicle or train of vehicles is sealed across each end face with resilient material with respect to the duct inner wall surface such that the vehicle inner air pressure and the motivating pressure differential may be maintained. The overall system envisions the use of a plurality of air pumping stations disposed along the vehicle transport duct at particular intervals which can be determined by the operational load and speed requirements of the vehicular system and the functional requirements of the transportation system. Each vehicle may be mounted on wheels, rails or any type of friction reducing surface to reduce the friction between the vehicle and the duct walls. A network of air pressure valves may be utilized for creating increased pressure in certain portions of the duct which may be utilized for stopping the vehicle in conjunction with mechanical wheel brakes.

It is an object of this invention to provide an improved vehicular transportation system utilizing a pneumatic energy source.

It is another object of this invention to provide an improved pneumatic transportation system for cargo and passengers disposed within a closed duct, the system including a pump and valve arrangement to provide pneumatic pressure variations behind and in front of the vehicle utilized for propulsion and a valving system to regulate and maintain pressure variation relative to the vehicle.

But still another object of this invention is to provide a transportation system for urban and rural transport of goods and passengers having improved efficiency, reduced cost per vehicular travel per mile and ease of maintenance reducing overall operating costs utilizing pneumatic energy of the propulsion source.

And yet still another object of this invention is to provide an overall pneumatic system for propelling one or more vehicles within a closed duct system employing pumping devices which increase pressure behind the vehicle and produce pressure reduction in front of the vehicle to provide a pressure differential for driving the vehicle within the duct.

In accordance with these and other objects which will be apparent hereinafter, the instant invention will now be described with particular reference to the accompanying drawings.

PREFERRED EMBODIMENT OF THE INVENTION

Figure 1:
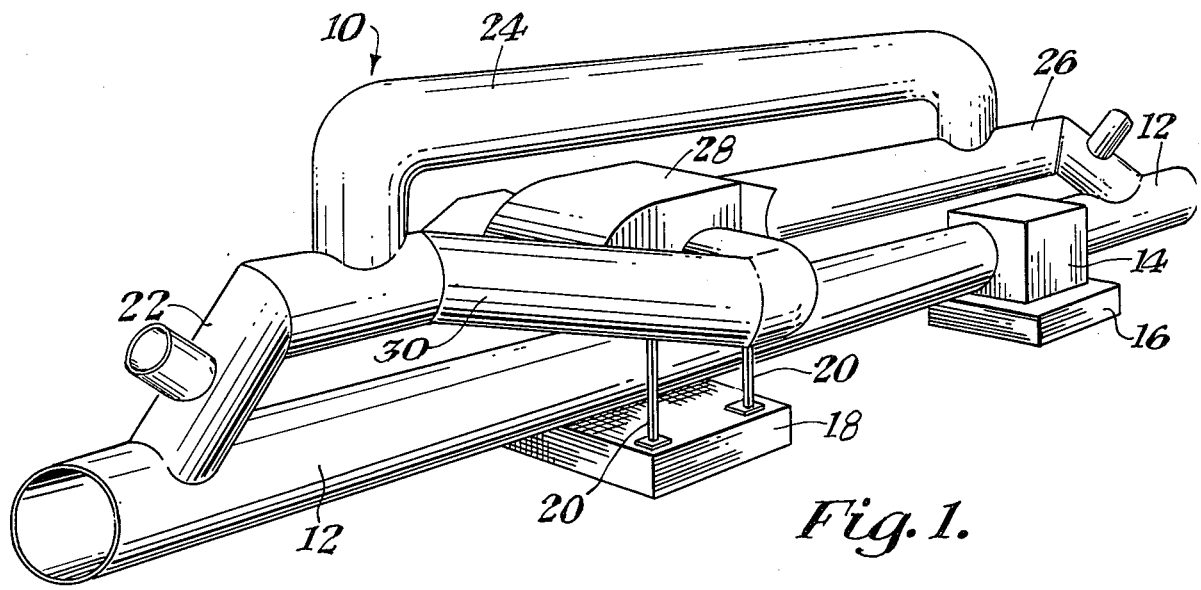
FIG. 1 shows a perspective view of a portion of the instant invention including a pumping station and valving vehicle

Referring now to FIG. 1 of the drawings, a portion of the transport duct 12 is shown in conjunction with a pumping station which includes a centrifugal pump 28 which is connected to the main transport duct 12 on the suction side of the pump by conduits 22 and 30 and on the exhaust side of the pump 28 by conduit 26. Another conduit 24 is connected on both sides of the pump to conduits 22 and 26 which provides a conduit for the by pass flow around pump 28. The pumping station includes a valve housing 14 connected to the transport conduit 12 which is supported on a foundation block 16. The main transport conduit 12, pump 28 and the air flow conduits may be supported on the ground by a foundation of concrete or the like 18 with supporting struts 20.

The particular number of pumping stations and their spacing upon along the main transport duct 12 is a function of several variables, which include the topography of the particular areas where the system is deployed, and dynamic drag of the moving air (skin friction considerations along particular lengths of the duct). For example, the pumping stations may be closer together if the transport duct is in an inclined area where the vehicles will be traversing on a slope which would thus increase the energy requirement for driving a vehicle.

Figure 2:
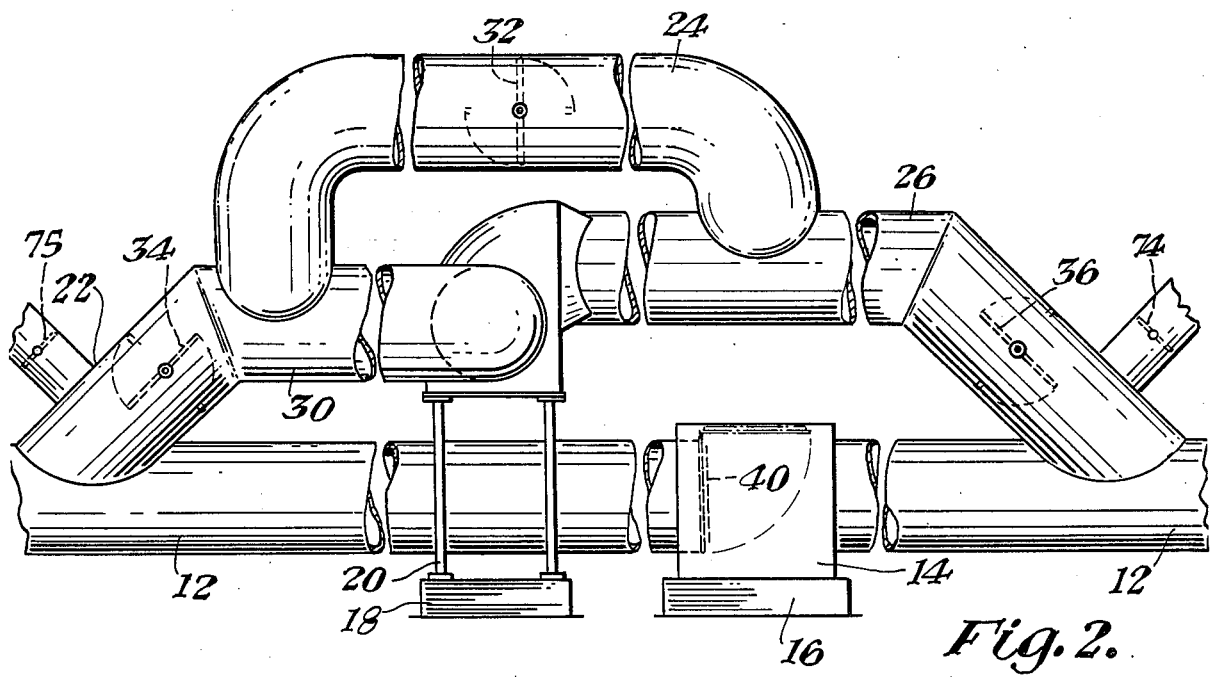
FIG. 2 shows a side, fragmentary elevational view of the pumping station of FIG. 1.
Figure 6:
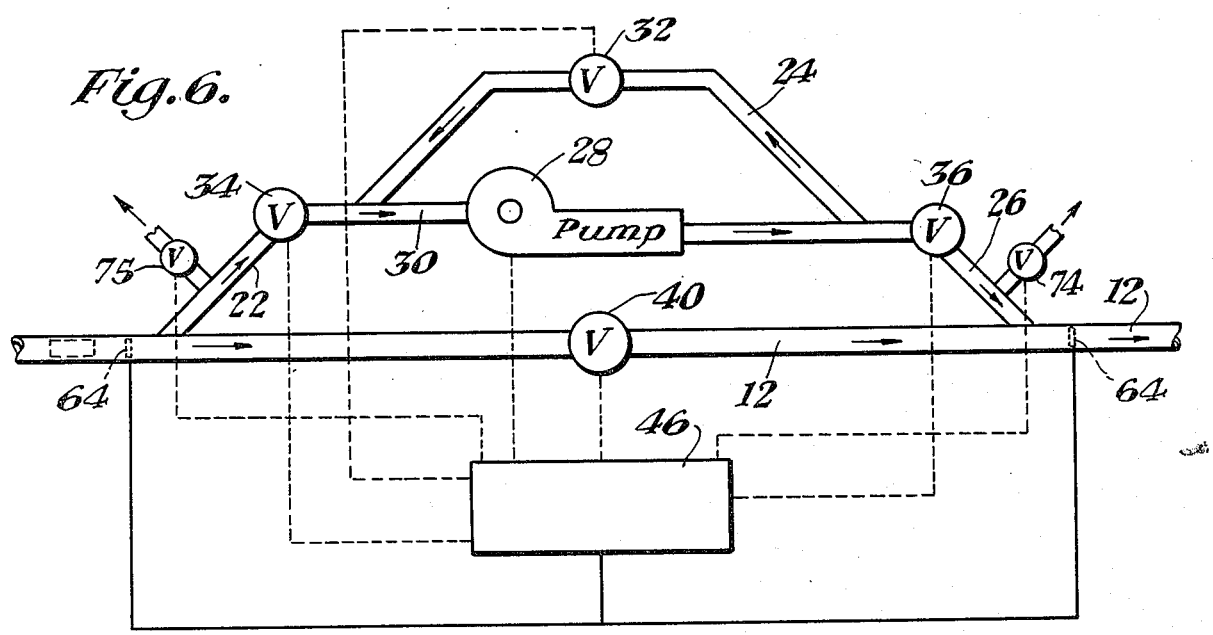
FIG. 6 shows a schematic diagram of the valve control system at a typical pumping station in accordance with the instant invention.

The overall system is designed with the use of a plurality of pumping stations between points of destination to control the movement of the vehicle which includes accelerating the vehicle from its beginning point, maintaining the vehicle at a constant velocity throughout its transit through the duct system and safely stopping the vehicle at the destination point. The overall guidance operation including the acceleration, transit, and stopping phases are controlled through an electronic monitoring and control means which monitors the location and speed of the vehicle within the transport duct in conjunction with particular pumping stations for actuating particular valves to insure proper acceleration, constant velocity, or deceleration or stopping of the vehicle as necessary. FIGS. 2 and 6 show a representative pumping station with the pump 28 being disposed in air flow communication with the main transit duct 12 via conduits 22, having a valve 34 which may be either open or closed, conduit 30 and conduit 26, housing a valve 36. The by pass conduit 24 has a valve 32. Dump valves 74 and 75 are also provided which are used for acceleration and stopping. After a vehicle is accelerated and is moving through the main transit duct, as it approaches a pumping station, an electrical means sensing the position of the vehicle relative to the pumping station sends a signal to the control circuitry which actuates the valves in the following manner. In the normal transit posture (when the vehicle is between pumping stations and at a constant velocity before reaching the approach position of the pumping station), valve 40 is closed such that the main duct section is sealed between pumping stations, while valves 34 and 36 would be open allowing the centrifugal pump 28 to draw a suction through conduit 22 and move the air around closed valve 40, pumping it into conduit 26 creating a high pressure side on the right side of closed valve 40. In this discussion, the vehicle (shown dotted in FIG. 6) is assumed to be moving from left to right through duct 12. Valve 32 in the by pass conduit 24 would be in the closed position as shown. Thus, as shown in FIG. 2, the pumping station is in its normal operational posture in which air is being withdrawn from one section of conduit 12 while simultaneously being pumped into the next section of conduit 12. As the vehicle approaches the pumping station, it becomes essential that valve 40 opens to allow transit of the vehicle through the valve housing while at the same time the pressure differential across the valve 40 be equalized to allow the valve to open easily. The valve itself may be opened by any electro-mechanical device and can be actuated by an electronic signal from a sensor 64 which is actuated when the vehicle is at a particular location within the duct as it approaches the pumping station. To aid in the pressure equalization as the vehicle approaches the intersection of conduits 22 in the main transport duct 12, valves 34 and 36 close and valve 32 opens. This allows the centrifugal pump 28 to continue operating with the fluid being recirculated through by pass conduit 24 as the pressure and momentum of the vehicle carries it from left to right past open valve 40. As soon as the vehicle has passed the intersection of conduit 26 and the main transport duct 12, valve 40 closes and valves 34 and 36 open while valve 32 closes, thus allowing air to immediately be pumped back into the duct 12 on the right side of valve 40, increasing the air pressure behind the vehicle. Thus as between two adjacent pumping stations along transport duct 12, the transport duct system is an air sealable conduit (between duct valves), with an air source for increasing pressure at one end of the sealed conduit section and an air removal source at the other end of the sealed conduit section. FIG. 6 shows a particular control system which can be utilized to effectively open and close each of the valves in the proper sequence at the proper time. Vehicle (dotted) travels towards the pumping station in conduit 12 with a pair of sensing switches 64 disposed in the conduit which, when contacted by the vehicle, sends an electrical signal to a master control unit 46 which may be an electrical switching unit which sends signal to an electromechanical device such as a solenoid to position valves 40, 34, 32, 36, 74 and 75 as has been described above. The control unit may also be used to actuate and power the centrifugal pump 28. Thus by use of the sensing switches 64, the pumping station can be disposed in one of two postures for the total overall operation of the system as has been described above. Valves 74 and 75 are positionable to provide a variable amount of air flow to regulate the suction and high air pressures on each side of the valve 40. This is necessary for the smooth acceleration or deceleration of the vehicle as it approaches or leaves the terminal.

Figure 3:
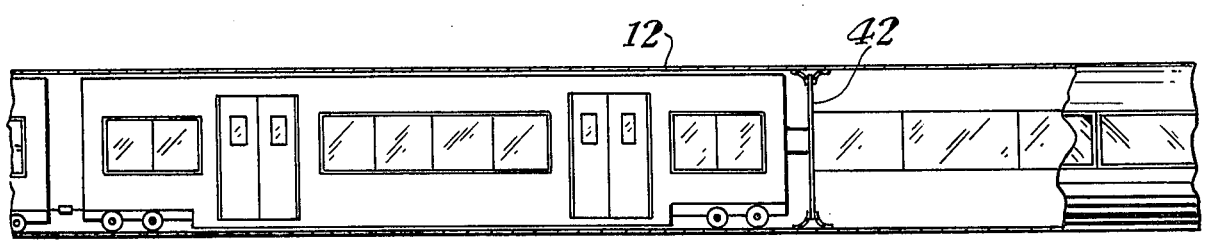
FIG. 3 shows a fragmentary, partially cut-away side elevational view of the main transport conduit and a representative passenger vehcle utilized in the instant invention.

FIG. 3 shows the deployment of a particular passenger vehicle within transport duct 12 which includes an air sealing diaphragm 42 which seals the vehicle at its front and rear from the surrounding pressure within the duct. This sealing barrier or diaphragm 42 is very essential to the operation of the device to prevent equalization of pressure, at each end of the vehicle, and pressure losses which would reduce the effective vehicle motivating force.

Figure 5:
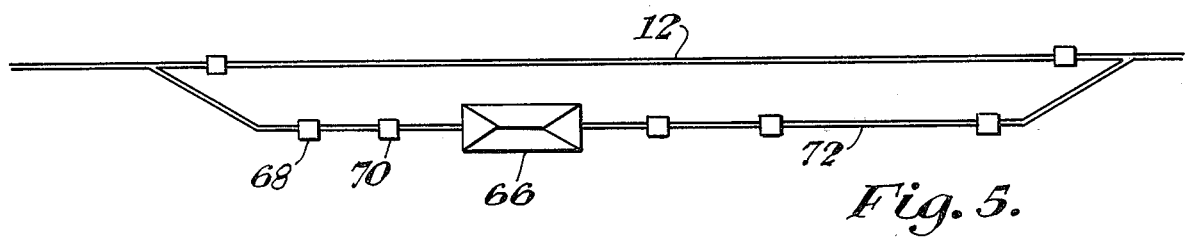
FIG. 5 shows a schematic drawing of a segment of the main duct system with a terminal side coupling including the auxiliary pumping stations used in the instant invention.
Figure 4:
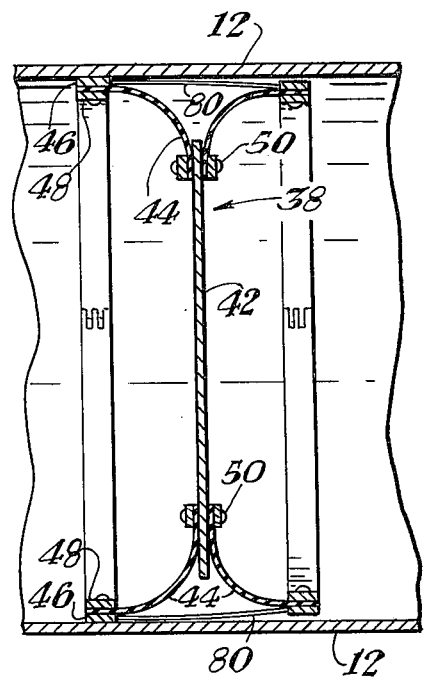
FIG. 4 is a side elevation in cross-section of the sealing diaphram and main duct as utilized in the instant invention.

FIG. 4 shows one particular sealing means which is diaphragm 38 which may be used to seal the vehicle exterior at each end from the duct interior. The diaphragm sealing means 38 is comprised of a rigid plate 42 which is coupled to the vehicle (not shown in FIG. 4) at its front or rear section. Sealably attached around rigid plate 42 are a pair of flexible donut-shaped resilient skirts 44 which are coupled to the plate by rivets 50. Around the circumference of skirt 44 are a pair of sealing pads 46 and 48 which are themselves circular with the pad 46 engaging the inner wall of conduit 12 in a sealable manner. Because the skirt 44 is flexible, higher air pressure shown by the arrows on the left side of the diaphragm push against the skirt forcing it and pad 46 in tight engageable contact with the inner wall of the duct 12. Thus the pressure differential with the higher pressure on the concave side of the diaphragm presses outwardly around the circumference of the skirt to insure a tight seal all the way around the perimeter of the diaphragm and holds the pad which is circular against the duct all itself. The circular pads 46 and 48 have small spacing joints about their circumference to allow them to collapse to a smaller diameter. The same type of diaphragm is used in the front and rear of the vehicle, as shown in FIG. 4, to be used for stopping the vehicle by increasing the pressure on the right. A flexible connector 80 couples the left and right pads together. The skirt itself may be of any rubber or rubber-like material that is flexible while the sealing pad 46 would be selected to provide a proper air seal between the duct and wall and the vehicle while at the same time reducing the skin friction or frictional drag by the selection of material between the duct and the wall and the pad itself. Thus the sealing pad may be of a soft metal or the like to reduce frictional drag. FIG. 5 shows a duct 12 having a side coupling duct 72 which may be used to decelerate and accelerate the vehicle from a terminal 66 which may be used to discharge passengers or cargo. A control system (not shown) would be used to divert the vehicle moving in duct 12 into the side coupling 72 at the particular junction of the two ducts using electronic control by track coupling or other methods which would cause the vehicle to be received into duct 72. An additional array of pumping stations shown as blocks, such as 68 and 70, are disposed along both duct networks 12 and 72. The pumping stations on one side of the terminal would be used to decelerate the vehicle as it approaches the terminal, while the ones on the opposite side of the terminal would then be used to accelerate the vehicle back up to speed.

FIG. 6 illustrates the pumping station in its operation as shown in FIG. 2 which includes a control system for use with the pumping station using electrical signals to change the opening and closing of the various valves such as the main duct valve 40, intake valve 34 going to the pump 38 and the exhaust valve 36 leading from pump 38, along with the by pass network which includes valve 32. Dump valves 74 and 75 can be regulated to reduce pump intake or output to vary the air pressure in the transport duct. As a vehicle, shown dotted, approaches the main duct valve 40, a sensor 64 sends an electrical signal to the control unit which then emits a signal which opens valve 40, closing valves 34 and 36 and opening by pass valve 32. After the vehicle 48 has passed the duct valve 40 (assuming the vehicle is moving from left to right in FIG. 6) a second sensor 64 detects the passage of the vehicle which sends the signal back to the control unit closing main duct valve 40 and opening intake valve 34 and exhaust valve 36. This also closes the by pass valve 32. Thus the system after vehicle passage would be restored to its prior posture before the vehicle reaches the pumping station.

Figure 7:
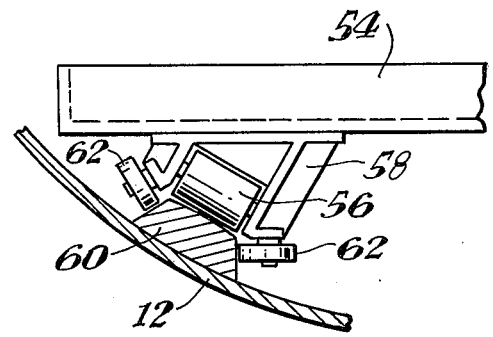
FIG. 7 shows a fragmentary elevational cross-section of a vehicle roller and rail as utilized in the instant invention.

FIG. 7 shows one particular embodiment in which the transport vehicle may be supported such as on a track 60 by a large roller 56 which is rotatably mounted and connected to the vehicle by a support frame 58 coupled to the vehicle housing. Auxiliary wheels 62 can be used to stabilize the vehicle on the track 60. A pair of tracks, such as tracks 60, are mounted on the inside of the duct in a parallel fashion along longitudinally and the particular number of roller type wheels pulling the vehicle can be determined by the weight loading and other factors of the vehicle itself. Other movable support means may also be used with the vehicle such that the invention is not to be limited to the particular wheels employed on the vehicle.

Figure 8:
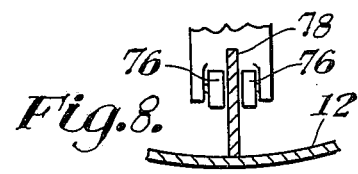
FIG. 8 is a front elevation in cross-section of the mechanical braking system including the brake pads.

The mechanical braking system which augments the pneumatic system described above may be conventional if the vehicle utilizes wheels or may be a plurality of braking shoes attached to the vehicle which engage the sides of a raised center plate disposed along the duct floor. FIG. 8 shows the raised plate 78 connected to the duct wall 12 with engageable shoes or brake pads 76 which are attachable to the vehicle.

The system is designed to be driven with or without a human operator on board the vehicle.

Referring back to FIG. 6, additional dump valves 74 and 75 may be added which allows the pumping station as shown to be used at the accelerating and decelerating locations along the duct. The valves 74 and 75 may be variably opened and regulated with regard to volume of air flow such that the amount of air can be regulated which will affect the amount of air withdrawn from the duct through conduit 22 and the amount of air forced into the duct 12 through conduit 26, such that at certain desired locations the effective duct air flow pressure can be regulated by opening valves 74 and 75 to particular positions. Thus by opening valve 74, air will be dumped through this valve which will reduce the effective air flow into duct 12 if it is desired not to create a higher pressure of air in that section of the duct or if the pressure of air in the duct is to be regulated which can be done by the amount of opening of the dump valve 74. Likewise, valve 75 may be moved from an open to a closed position or varied at points therebetween for allowing air to flow into conduit 22 which would increase the air pressure in the duct section before conduit 22. The use of valves 74 and 75 would be in conjunction with accelerating or decelerating the vehicle by regulating or changing the differential air flow on each side of the vehicle through the manipulation and regulation of these valves. These valves are controlled from electronic signals in control box 46 which set the valves to particular positions dependent upon the acceleration and location of the vehicle in the duct system itself.

The instant invention has been shown and described herein in what is considered to be the most practical and preferred embodiment. It is recognized, however, that departures may be made therefrom within the scope of the invention and that obvious modifications will occur to a person skilled in the art.

What I claim is:
1. A pneumatic transportation system comprising:
 a transport duct which is pneumatically sealed along its length;
 a vehicle having front and rear sealed portions disposed within said duct, said sealing providing a pneumatic seal between the interior surface of the duct and the vehicle itself;
 means coupled to said duct for providing air pressure, said means including an intake conduit connected to said duct and an exhaust conduit connected to said duct, said intake conduit withdrawing air from a portion of said duct and said exhaust conduit disposing said air into another portion of said duct;
 a duct valve connected within said duct disposed between said intake conduit and said exhaust conduit from said air pressure means;
 a control means for opening and closing said duct valve means as a function of vehicle location within said duct;

an intake conduit valve disposed within said intake conduit and an exhaust conduit valve disposed within said exhaust conduit and a by-pass conduit disposed around said air pressure means, said intake conduit valve and said exhaust valve providing for stopping the flow of intake and exhaust air into said duct, said intake conduit valve and said exhaust valve connected to said control means for stopping air flow through said intake conduit valve and exhaust conduit valve as a function of vehicle location.

2. A pneumatic transportation system, comprising:
a pneumatic sealed duct, a plurality of duct valves disposed along said duct for providing individual sealed sections of said duct;
a plurality of air pumps, each of said pumps having an intake and an exhaust conduit coupled on each side of one of said valves within said conduit;
a track means disposed within said duct;
a vehicle connected to said track and engageable for moving along said duct track;
a diaphragm means connected to said vehicle at the front and rear of said vehicle, said diaphragm creating a pneumatic seal between said duct inner wall and said diaphragm seal;
a sensing means connected to said track which is actuated when said vehicle crosses said sensing means; and
a valve position control means connected to said sensing means and connected to said plurality of duct valves for sealing particular sections of said duct, and a plurality of auxiliary valves connected to said valve position control means, each connected to the air pump intake and exhaust conduits for opening and closing said valves to reduce and stop air flow from said air pump as a function of vehicle location.

* * * * *